United States Patent
Strawn et al.

(10) Patent No.: US 8,139,035 B2
(45) Date of Patent: Mar. 20, 2012

(54) TOUCH SENSITIVE KEYPAD WITH TACTILE FEEDBACK

(75) Inventors: Andrew Strawn, Hants (GB); Andrew Raymond Bick, Dorset (GB); Crispian Tompkin, Los Angeles, CA (US); Daren Leith, West Hills, CA (US); Simon Bradford, Espoo (FI); Luke Miles, London (GB); Brian Davidson, Surrey (GB)

(73) Assignee: Nokia Corporation, Espoo (FI)

( * ) Notice: Subject to any disclaimer, the term of this patent is extended or adjusted under 35 U.S.C. 154(b) by 701 days.

(21) Appl. No.: 11/472,838

(22) Filed: Jun. 21, 2006

(65) Prior Publication Data
US 2007/0296702 A1    Dec. 27, 2007

(51) Int. Cl.
G06F 3/041 (2006.01)
H03K 17/94 (2006.01)
H01H 19/00 (2006.01)

(52) U.S. Cl. ............ 345/173; 341/22; 341/27; 200/11 R
(58) Field of Classification Search ............... 345/168, 345/173–174; 341/22, 27; 200/11 R
See application file for complete search history.

(56) References Cited

U.S. PATENT DOCUMENTS

| | | | | |
|---|---|---|---|---|
| 4,088,855 A * | 5/1978 | Emery | ............... | 200/16 A |
| 4,500,758 A * | 2/1985 | Guckenheimer | ............... | 200/5 A |
| 5,138,119 A * | 8/1992 | Demeo | ............... | 200/5 A |
| 5,140,116 A | 8/1992 | Schmitt-Walter | ............... | 200/314 |
| 5,887,995 A | 3/1999 | Holehan | ............... | 400/479.1 |
| 5,917,906 A | 6/1999 | Thornton | ............... | 379/433 |
| 6,118,435 A * | 9/2000 | Fujita et al. | ............... | 345/173 |
| 7,279,647 B2 * | 10/2007 | Philipp | ............... | 200/5 R |
| 2002/0021280 A1 * | 2/2002 | Kato et al. | ............... | 345/156 |
| 2003/0011972 A1 | 1/2003 | Koo | ............... | 361/681 |
| 2005/0052425 A1 * | 3/2005 | Zadesky et al. | ............... | 345/173 |
| 2006/0034042 A1 * | 2/2006 | Hisano et al. | ............... | 361/681 |
| 2006/0079279 A1 | 4/2006 | Lin | ............... | 455/557 |
| 2006/0238514 A1 * | 10/2006 | Rosenberg et al. | ............... | 345/173 |
| 2007/0236472 A1 * | 10/2007 | Bentsen et al. | ............... | 345/173 |

FOREIGN PATENT DOCUMENTS

| | | |
|---|---|---|
| DE | 9105230 U1 | 4/1991 |
| DE | 102004040395 A1 | 3/2005 |
| EP | 1 513 055 A2 | 3/2005 |
| JP | 2000200141 A | 7/2000 |
| WO | WO-03/100092 A2 | 12/2003 |
| WO | WO-2004/107146 A2 | 12/2004 |

OTHER PUBLICATIONS

International Search Report, Application No. PCT/EP2006/008110 mailed Mar. 27, 2008, 13 pgs.
EP Office Action, Application No. 06 776 914.1-1527, Sep. 27, 2010, 7 pgs.

* cited by examiner

*Primary Examiner* — Amr Awad
*Assistant Examiner* — Jonathan Boyd
(74) *Attorney, Agent, or Firm* — Harrington & Smith

(57) ABSTRACT

A keypad includes discrete keys formed by touch sensors or virtual keys on a touch sensitive area. The discrete or virtual keys are mechanically linked to a biased switch. The key that has been touched during a keystroke is identified through a signal from the touch sensors whilst a keystroke is recorded upon a signal from the biased switch. The combination of the touch sensors with a biased switch provides tactile feedback. The use of touch sensors or a touch sensitive area allows the keypad to be constructed with a substantially flush surface without parting lines.

29 Claims, 7 Drawing Sheets

TOUCH SENSITIVE KEYPAD WITH TACTILE FEEDBACK

FIELD OF THE INVENTION

The present invention relates to keypads and keyboards for electronic devices, in particular to keypads and keyboards that use touch sensors.

BACKGROUND OF THE INVENTION

Electronic devices with a user interface often face heavily contradicting requirements. On one hand the devices are required to be compact and light, whilst on the other hand the user interface should be user friendly and comfortable. These requirements are especially contradicting for mobile devices which place extra high requirements on the size and weight aspect. Increased complexity of mobile devices, such as mobile phones or smart phones have led to an increasing need for large displays. The "front" surface of the mobile device is typically completely occupied by the display and the keypad. Thus, additional space for the display can often only be obtained by allocating less space to the keypad.

The display of a conventional mobile phone is typically a flat LCD color screen for example with TFT technology. The keypad of a conventional mobile phone typically includes a key mat with a plurality of discrete keys thereon and an equal plurality of dome switches there below.

These two elements of the user interface of these electronic devices make up the major part of the front of the device. The front of the device can of course be divided into two separate parts in case the device is of the folding or sliding type. Common for any of these types is the requirement that the device is small and the display is large.

Thus, there is a need to provide a more compact keypad.

Further, there is a need to enhance the design of mobile devices since the looks of the device are a very important competitive factor on the market. Thus, there is also a need for a keypad that provides designers with increased design freedom and flexibility.

DISCLOSURE OF THE INVENTION

On this background, it is an object of the present invention to provide a compact, design-and user friendly keypad. This object is achieved by providing a keypad for use with an electronic device, said keypad comprising a plurality of discrete keys formed by touch sensors or a plurality of virtual keys in a touch sensitive area, said plurality of discrete or virtual keys being mechanically coupled to a biased switch that is activated by pressing any of said discrete or virtual keys.

Through the use of touch sensors the surface area required for providing the keys can be kept small and without parting lines, thereby also giving designers a greater freedom to operate, whilst the use of a biased switch provides users with tactile feedback and reduces inadvertent keystrokes from being inadvertently recorded when an object comes into contact with any of the touch sensors.

Preferably, the biased switch provides tactile and/or aural feedback. The biased switch may be supported by other resilient elements to provide tactile feedback to the user. The biased switch may be supported by sounds from a loudspeaker in the device in which the keypad is used to support aural feedback.

The biased switch may act with a snap action, to further improve tactile feedback. The biased switch can be a dome switch.

Preferably, the discrete keys form a flush surface substantially without part lines. The keys, or the flush surface forming the keys is preferably provided with key graphics.

The key graphics can be coupled to a lighting system, and the key graphics are substantially invisible when said lighting system is not active. Thus, the lighting system can be used to provide optical feedback to the user.

The touch sensors may include capacitive elements operatively coupled to said discrete keys.

The touch sensitive area can be formed by a capacitive touch pad or by a touchscreen.

Preferably, the touch sensors or the touch sensitive area are disposed on one side of a plate member, and the plate member is coupled to the biased switch. Thus, a simple construction is obtained in which a plate member moves to activate the biased switch.

Preferably, the biased switch is disposed under the plate member and pressure applied on the plate member results in pressure on the biased switch.

The biased switch may be disposed between said plate member and a substrate. Thus, a simple and compact keypad construction is obtained.

The biased switch may include a collapsible member disposed between the plate member and the substrate. Preferably, the collapsible member comprises a thin walled collapsible ring. The collapsible ring preferably comprises two ring members connected to one another by a fold line.

The biased switch may be configured to establish an electrical contact when the collapsible member collapses. Alternatively, a reverse construction with an electrical contact being interrupted when the collapsible member collapses could also be used.

The biased switch may comprise a resilient element that urges the plate member to an idle position. Thus, the mechanical construction of the keypad can be kept simple.

Preferably, a force with a magnitude above a given threshold on said plate member causes said plate member to move from an idle position to a lower position or to a tilted position in which said biased switch establishes an electrical contact.

The plate member may have a substantial amount of travel between the idle position and a position in which the biased switch establishes an electrical contact. Thus, the user can experience a real keypad travel for improved user friendliness and confidence.

The keypad preferably includes a link mechanism converting a downward movement of one or of plurality of discrete keys or of a plate member with virtual keys into a sidewards movement or into a rotational movement.

Preferably, the link mechanism acts on the biased switch and the link mechanism may include a transversely sliding plate member for translating a downward movement of the keys into a transverse movement.

The sliding plate member is preferably slidably suspended between two oppositely disposed guide rails to obtain this mostly sliding mechanism. The biased switch can be disposed to face an edge of the sliding plate member. Preferably, the plate member comprises a plurality of recesses corresponding to the number of discrete keys. In this case the recesses may be provided with slanting edges that interact with slanting surfaces disposed on the underside of said discrete keys to thereby translate the downwards pushing force on the key into a sideward force.

It is another object of the present invention to provide an electronic device comprising a processor controlling the operation of the device and a keypad comprising a plurality of discrete keys formed by touch sensors or a plurality of virtual keys in a touch sensitive area, the plurality of discrete or virtual keys being mechanically coupled to a biased switch that is activated by pressing any of the discrete or virtual keys, said processor being coupled to said keypad and said processor being configured to determine which of said discreet or virtual keys has been pressed from a signal from said touch sensors or touch plate, and said processor being configured to determine that a keystroke has been entered when said biased switch is activated.

The virtual keys can be formed on a touch display and the processor may be configured to display virtual keys on the touch screen.

The device may further comprise an orientation sensor, in which case the processor can be configured to change the orientation of the virtual keys displayed on the touch screen in response to a signal from said orientation sensor. Thus, the orientation of the key graphics relative to the gravitational field can be maintained when the device changes orientation.

It is a further object of the invention to provide a method for registering keystrokes on a keypad or keyboard with a plurality of discrete or virtual keys, comprising identifying which of the keys has been struck with touch sensors, and determining that a keystroke has been made with a biased switch.

With this method, the advantages of touch sensors can be exploited without being exposed to the disadvantages associated with touch sensors.

The method may further comprise the step of allowing said discrete or virtual keys to travel between an idle position in which the biased switch is not activated and a position in which the biased switch is activated. Thus, the users are provided with the same tactile feedback that is associated with conventional keys.

The method may further comprise the step of providing a plurality of said discrete or virtual touch keys with tactile feedback by a mechanical link to the biased switch.

Further objects, features, advantages and properties of the keypads, electronic devices and methods according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

In the following detailed description, the keypad will be described by the preferred embodiments with reference to its use in a mobile communication terminal in the form of a cellular/mobile phone. However, the use in a mobile communication terminal is only exemplary, and the keypad could be used in any other electronic device.

Figure 1:
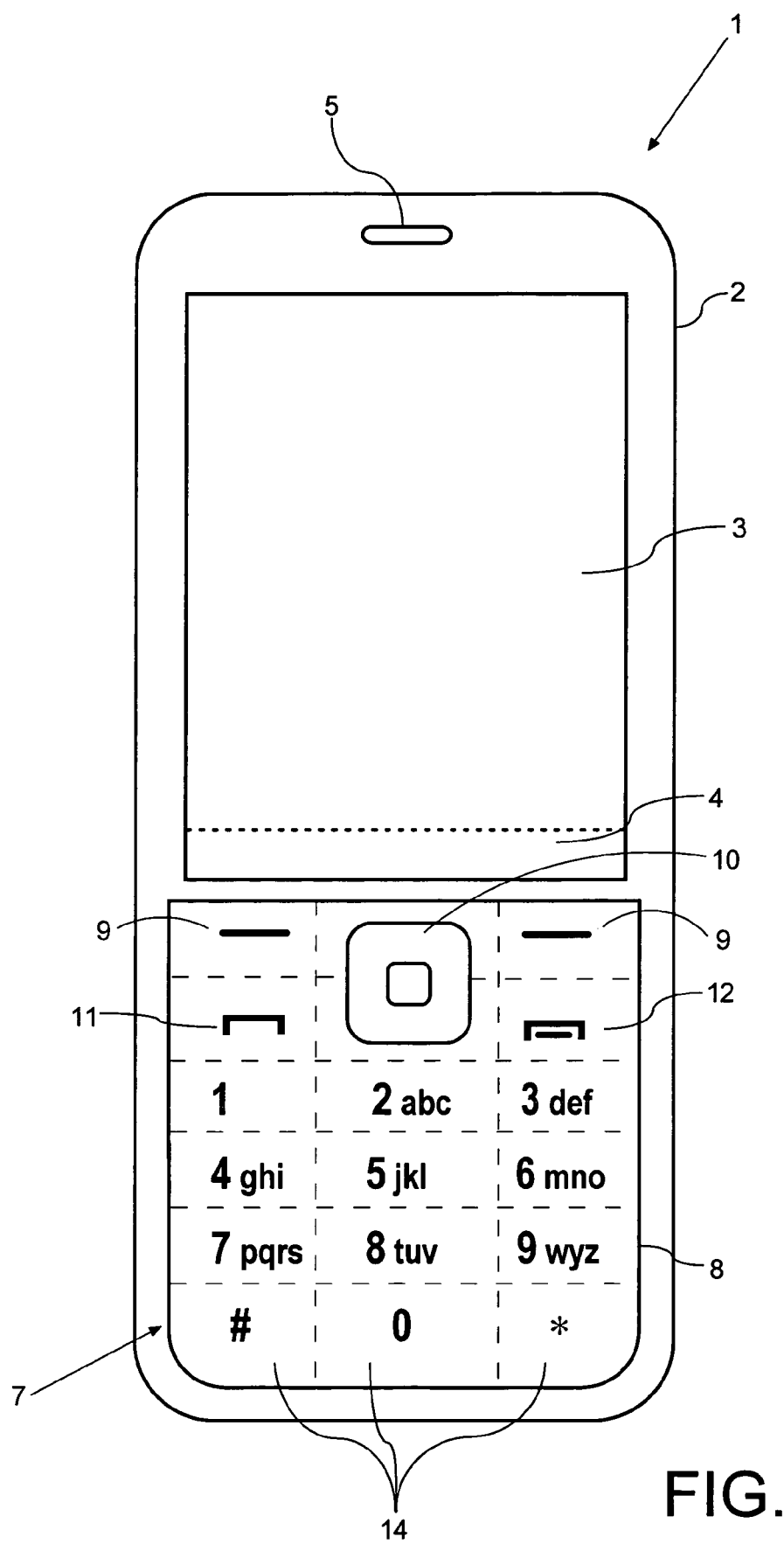
FIG. 1 is a front view of a mobile communication terminal with a keypad according to a first embodiment of the invention.

FIG. 1 illustrates a first embodiment of a keypad according to the invention implemented in a mobile telephone by a front view. The mobile phone 1 comprises a user interface having a housing 2, a display 3, an on/off button (not shown), a speaker 5 (only the opening is shown), and a microphone 6 (not visible in FIG. 1). The phone 1 is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The keypad 7 has a first group of keys as alphanumeric keys, by means of which the user can enter a telephone number, write a text message (SMS), write a name (associated with the phone number), etc. Each of the twelve alphanumeric keys is provided with a figure "0-9" or a sign "#" or "*", respectively. In alpha mode each key is associated with a number of letters and special signs used in the text editing.

The keypad 2 has additionally a second group of keys comprising two softkeys 9, two call handling keys (offhook key 11 and onhook key 12), and a 5-way navigation key 10 (up, down, left, right and center: select/activate). The function of the softkeys 9 depends on the state of the phone, and navigation in the menu is performed by using the navigation-key 10. The present function of the softkeys 9 is shown in separate fields (soft labels) in a dedicated area 4 of the display 3, just above the softkeys 9. The two call handling keys 11,12 are used for establishing a call or a conference call, terminating a call or rejecting an incoming call. This key layout is characteristic for e.g. the Nokia 6230i™ phone.

The navigation key 10 is a four- or five-way key which can be used for cursor movement, scrolling and selecting (five-way key) and is placed centrally on the front surface of the phone between the display 3 and the group of alphanumeric keys.

The alphanumerical keys, the softkeys 9 and the call handling keys 11,12 are formed by touch sensors 14 that are disposed on a plate member 8 that will be described in greater detail below. The parting lines between the touch sensors 14 are indicated by interrupted lines. The parting lines are shown for illustrative purposes and are not necessarily visible on the keypad 7 itself. The top of the surface of the keypad 7 can therefore be substantially completely flush. The navigation key 10 is not part of the plate member 8.

A releasable rear cover (not shown) gives access to the SIM card (not shown), and the battery pack (not shown) in the back of the phone that supplies electrical power for the electronic components of the mobile phone 1.

The mobile phone 1 has a flat display 3 that is typically made of an LCD with optional back lighting, such as a TFT matrix capable of displaying color images. A touch screen may be used instead of a conventional LCD display.

Figure 2:
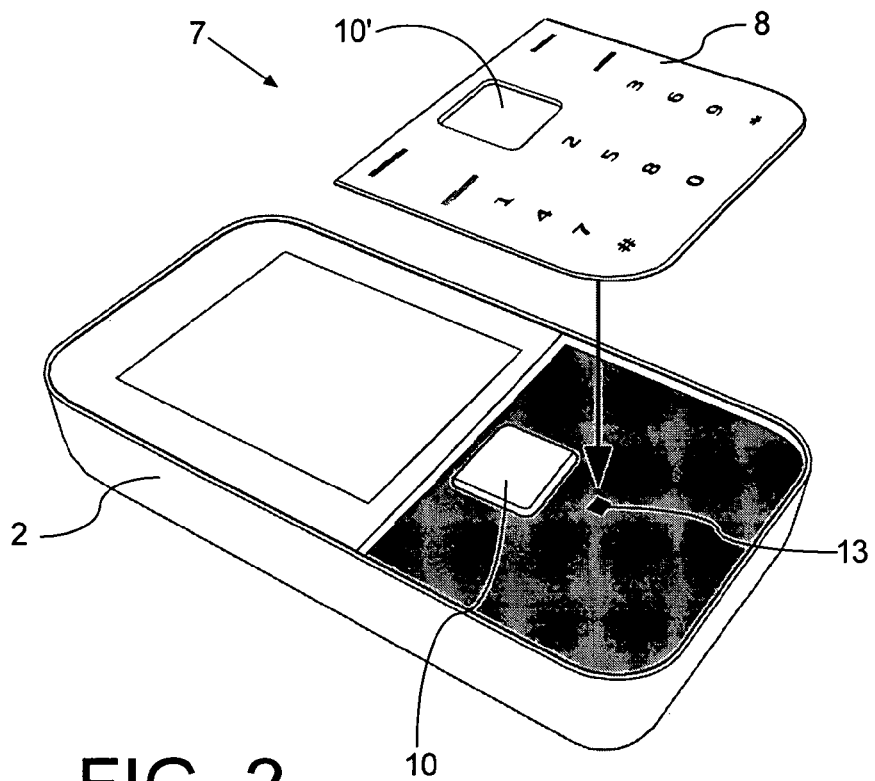
FIG. 2 is a partially exploded elevated view on a the mobile communication terminal of FIG. 1.
Figure 3:
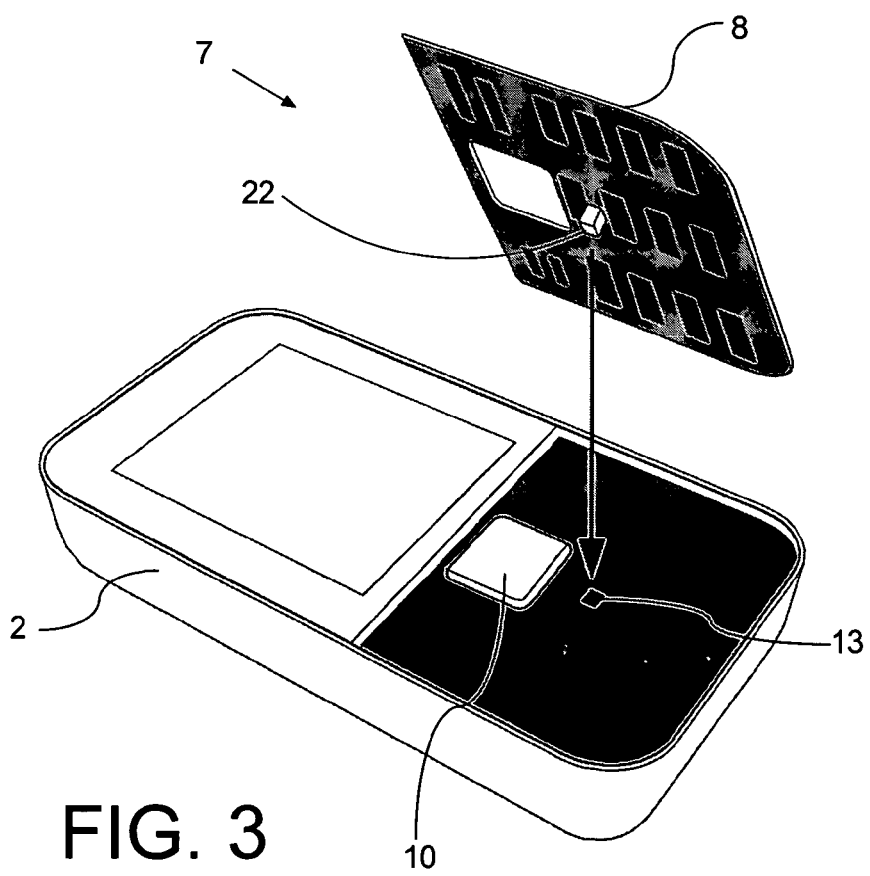
FIG. 3 is another partially exploded elevated view on the mobile communication terminal of FIG. 1.

FIGS. 2 and 3 illustrate the mobile phone 1 with the first embodiment of the keypad according to the present invention in exploded views. The keypad 7 comprises a plate member 8 with keypad graphics depicted thereon. The touch sensors 14 (such capacitive touch sensors) and backlighting 21 (FIG. 13) for the key graphics are disposed on the front of the plate member 8. The plate member 8 is provided with a suitable recess 10' through which the navigation key 10 may protrude. A peg 22 projects from the rear side of the plate member 8. The peg 22 serves to engage a biased switch 13, which is in this embodiment a dome switch.

Figure 4:
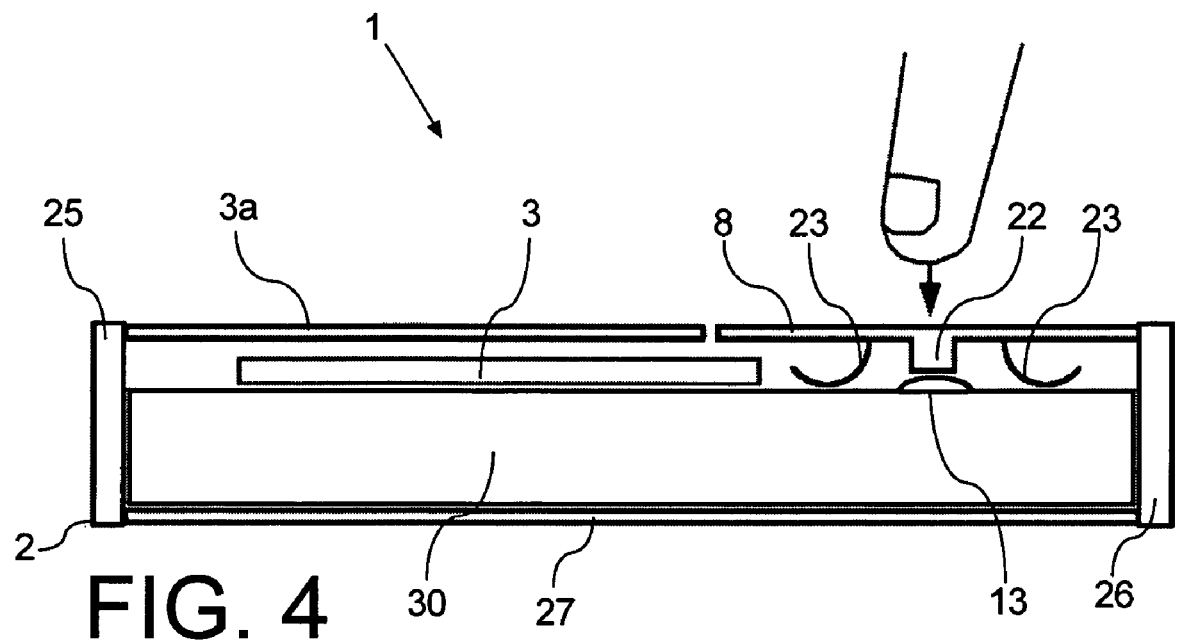
FIG. 4 is a cross-sectional view through the mobile communication terminal of FIG. 1 when the keypad is not depressed.
Figure 5:
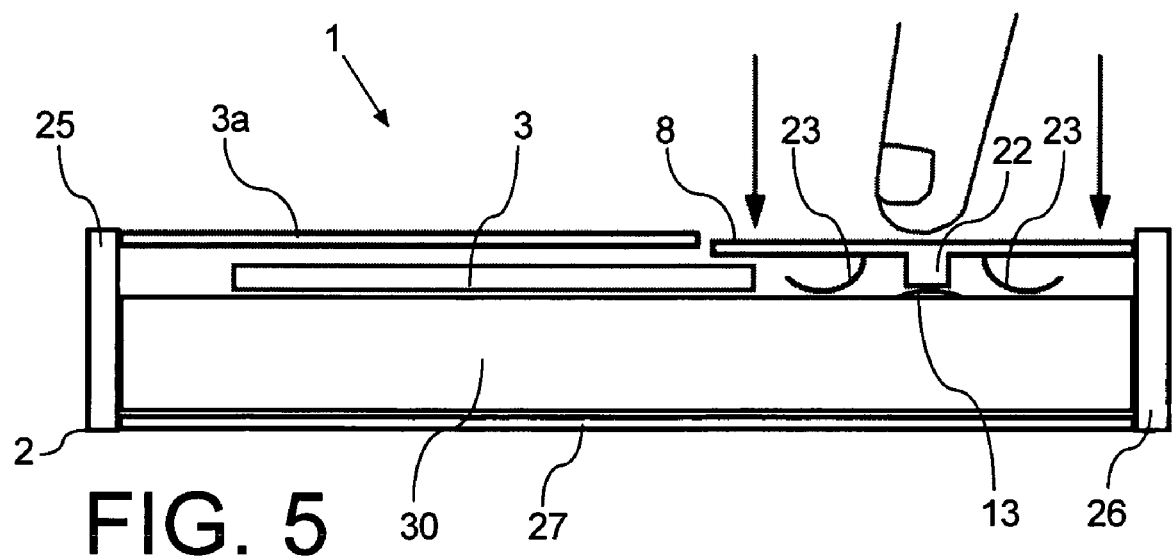
FIG. 5 is a cross-sectional view through the mobile a mobile communication terminal of FIG. 1 when the keypad is depressed.
Figure 6:
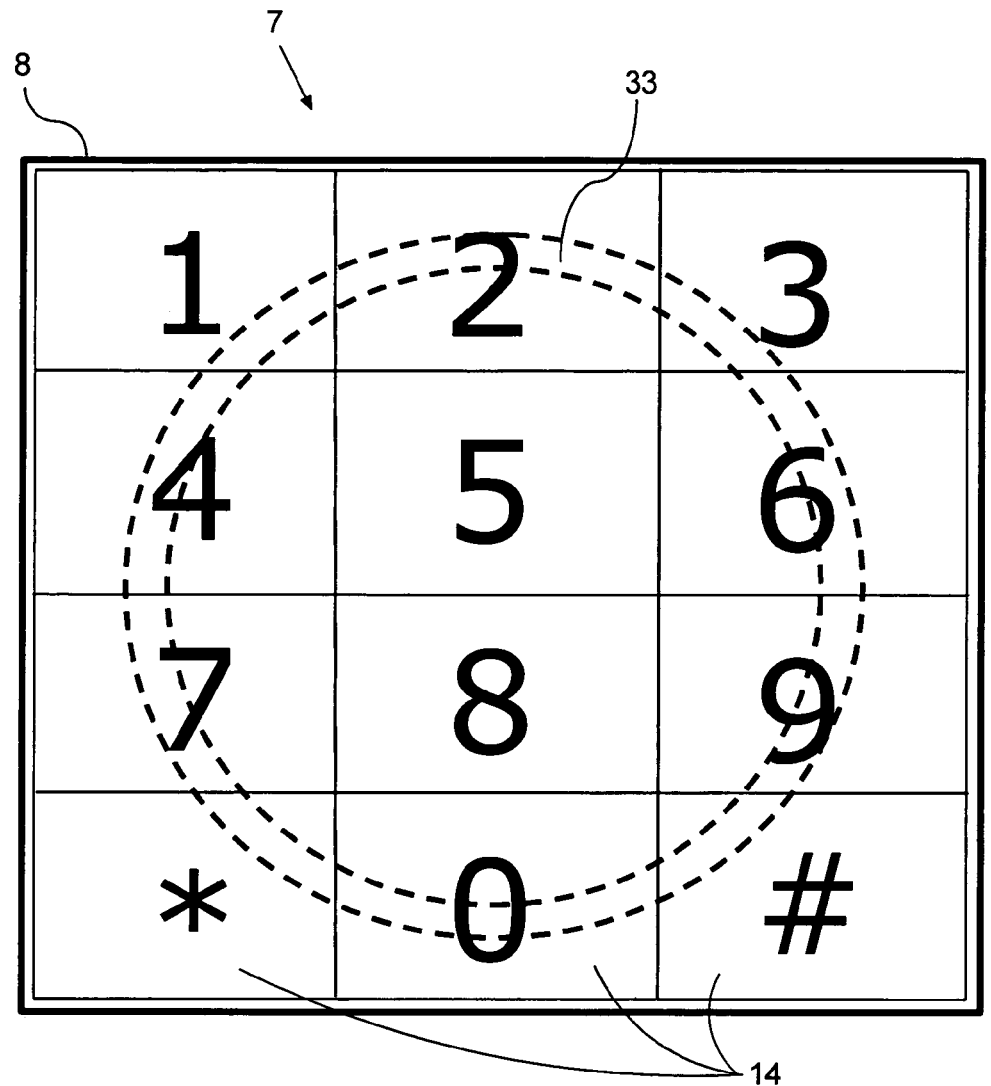
FIG. 6 is a front view of a keypad according to a second embodiment of the invention.

FIG. 4 is a cross-sectional view through the mobile phone 1 with the plate member 8 in a non-depressed or idle position. FIG. 5 is the same view with the plate member 8 in a depressed position. The housing 2 of the mobile phone includes a front cover 3a with a transparent window for viewing the display 3, a top member 25, a bottom member 26 and a rear cover 27. The interior components of the mobile phone 1, such as the battery, printed circuit board, antenna, speaker, inner frame, shielding, etc. are diagrammatically represented by block 30.

Leaf springs 23 serve to guide the plate member 8 and provide bias for the plate member 8 towards the idle position. The peg 22 may also be received in a guiding channel (not shown) that is unitary with the interior frame of the mobile phone 1. The snap action of the dome switch 13, in combination with the leaf springs and 23 provide a tactile feedback for the user when the pressing the plate number 23.

FIGS. 6 to 10 illustrate a second embodiment of the keypad 7 according to the invention. The second embodiment also includes a plate member 8 with a plurality of keys thereon, and includes in this embodiment only the numerical and "*" and "#" keys.

Parting lines are shown between the keys to show the user the borders between the neighboring keys, but in analogy to the first embodiment there is no constructional requirement for having parting lines so that the keypad can be provided with a substantially flush top surface.

Figure 7:
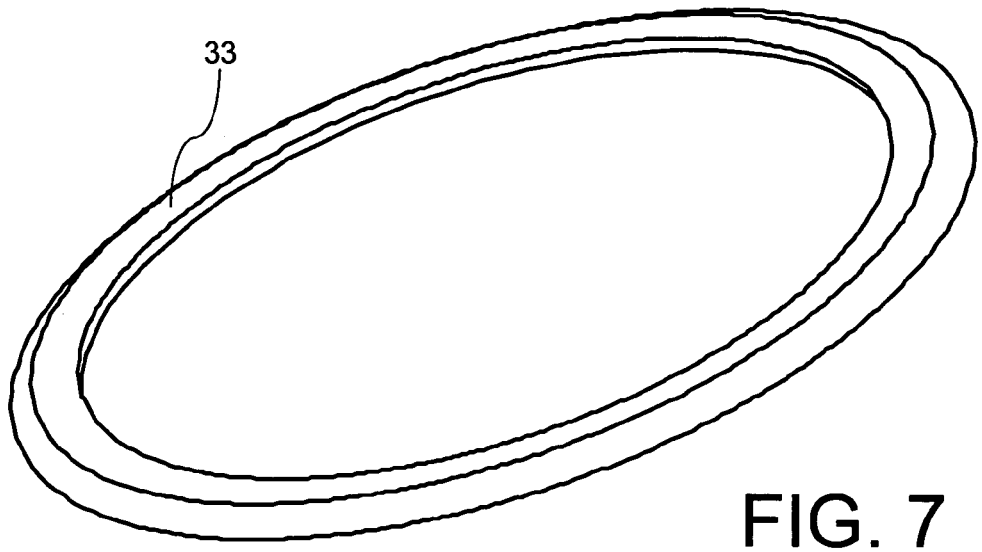
FIG. 7 is an elevated view of a collapsible ring used in the keypad of FIG. 6.

The keys are formed by touch sensors 14 on the front of the plate member 7. A collapsible ring 33 (indicated by interrupted lines) is attached to the rear side of the plate member 7. FIG. 7 illustrates the collapsible ring 33 in greater detail. Preferably, the collapsible ring 33 is composed from two ring members 33a and 33B that are connected to one another by a fold line.

Figure 8:
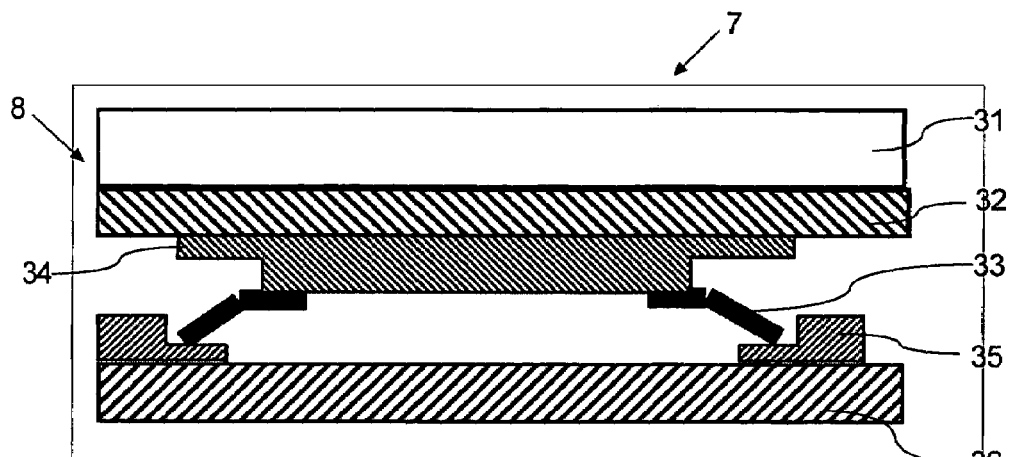
FIG. 8 is a cross-sectional view through keypad shown in FIG. 6 when the keypad is not depressed.

FIG. 8 is a cross-sectional view of the keypad when the plate member 7 is not depressed. The plate member 7 includes a cover layer 31 in which the key graphics are included and a capacitive sensor layer 32 in which the capacitive sensors 14 are included. A disc shaped upper support member 34 is attached to the underside of the capacitive layer 32. The upper support member 34 connects to the upper side of the collapsible ring member 33. The collapsible member 33 is connected by a fold line or similar hinged connection to a ring shaped lower support member 35. The lower support member 35 is secured to the printed wired board 36 of the mobile phone. The lower support member 35 could of course be secured to any other substrate or component of the device in which the keypad 7 is to be used.

Figure 9:
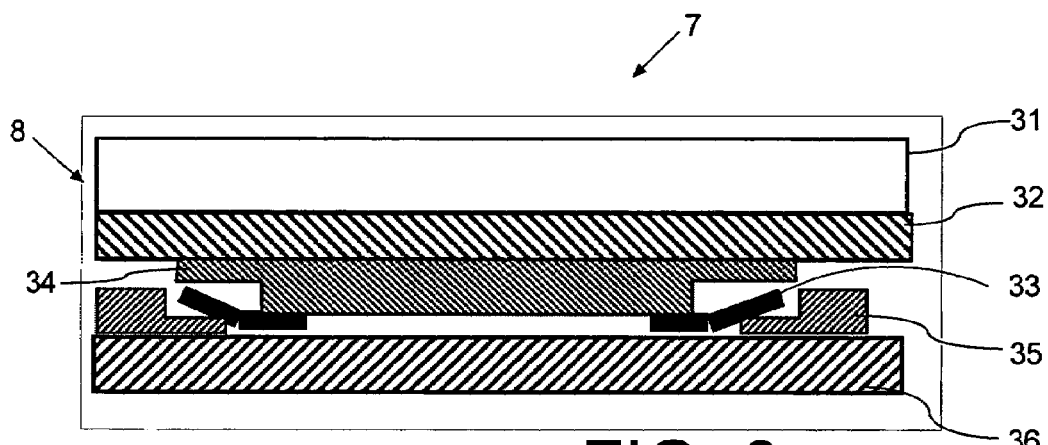
FIG. 9 is a cross-sectional view through keypad shown in FIG. 6 when the keypad is centrally depressed.

FIG. 9 shows the keypad 7 according to the second embodiment when it is depressed in a central position, e.g. when the user presses hard enough on the key marked "5". When the plate member 8 is in this position an electrical contact is established (contacts not shown, but could be formed by the collapsible ring 33 in collaboration with a ring contact disposed on the printed circuit board 36).

Figure 10:
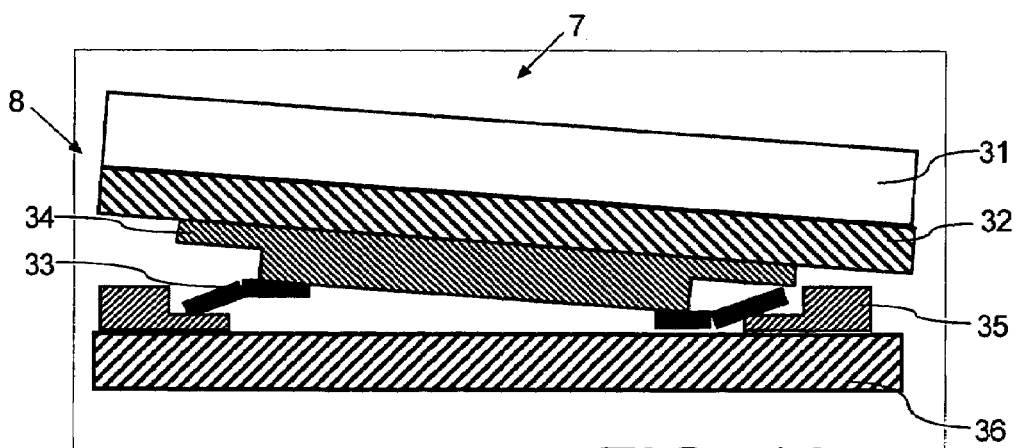
FIG. 10 is a cross-sectional view through keypad shown in FIG. 7 when the keypad is depressed off-center.

FIG. 10 shows the keypad 7 according to the second embodiment when it is depressed in an off-center position, e.g. when the user presses hard enough on a key along the periphery of the keyboard. When the plate member 8 is in this position an electrical contact is established.

Thus, in the second embodiment the biased switch 13 is formed by the collapsible member 33 in combination with contacts.

The concept of a ring shaped collapsible member supporting a plate member is not limited to the combination with touch sensors, keypads or other user interface components on the plate member. Neither does the ring shaped collapsible member need to be part of a device that creates and breaks an electrical contact. The ring shaped collapsible member disposed between a substrate and a plate member can be used to create a switching element with the plate moving between depressed and non-depressed positions. The movement of the plate member can be used to act as an electronic switch, but this is only one of the possibilities for the use of the ring shaped collapsible member. Instead, the ring shaped collapsible member can be used for mechanical feedback, or mechanical control of a moving element between various positions. In this context, the possibility of the plate being depressed at various positions (in the center, or along various positions along the circumference of the plate member) can be used to control various mechanical elements simultaneously or a few mechanical elements independently in a more complex manner.

Figure 11:
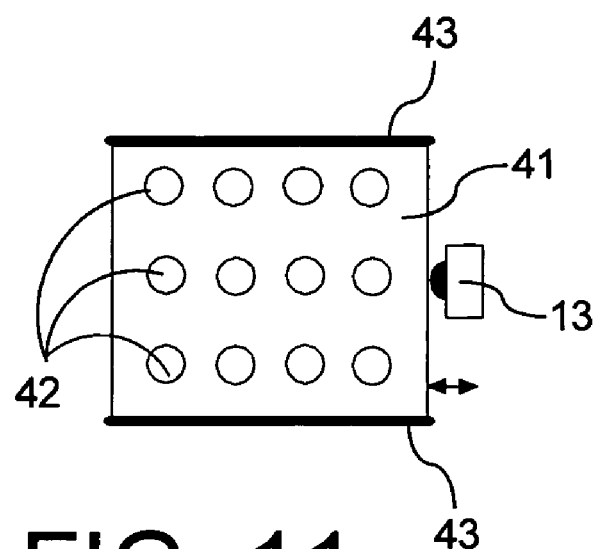
FIG. 11 is a top view on a detail of a keypad according to a third embodiment of the invention.
Figure 12:
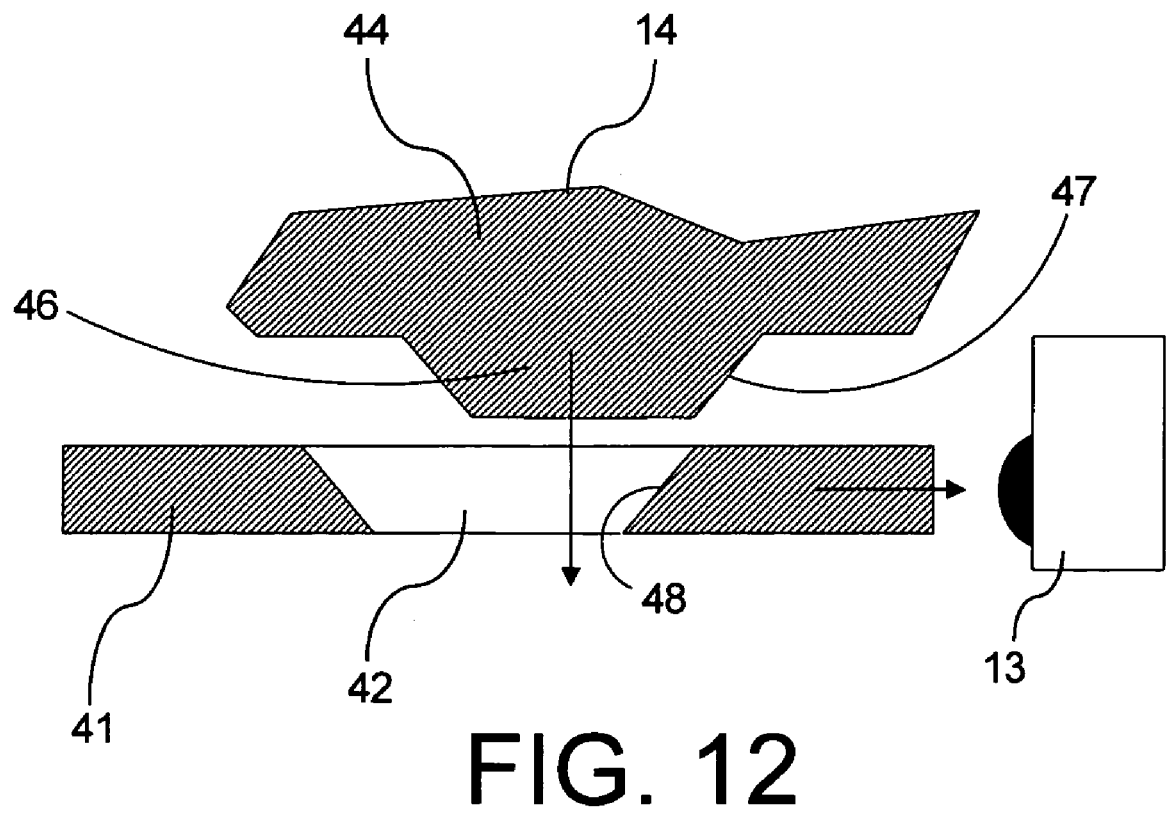
FIG. 12 is a cross-sectional view of a detail of the keypad of FIG. 11.

FIGS. 11 and 12 show a third embodiment of the keypad 7 according to the invention. The keypad comprises a plurality of keys 44. A touch sensor 14 is placed on the top of each key 44. A slidable plate member 41 is disposed under the keys 44. The slidable plate member is suspended between two parallel guide rails 43 and can slide back and forth as indicated in the double headed arrow in FIG. 11. A biased switch 13 is arranged to face one of the edges of the plate member 41. The resilient characteristic of the biased switch urges the slidable plate member 41 to an idle or return to position.

The slidable plate member 41 includes a plurality of recesses or holes 42 that equals the number of keys 44. The recesses or holes 42 are provided with a slanting edge 48 that collaborates with a slanting surface 47 that is provided on a protrusion of 46 on the underside of the keys 44. The slidable plate member 41 is urged by the switch 13 to assume the position indicated in FIG. 12.

When one of the keys 44 is depressed the cooperating two slanting surfaces 47 and 48 urge the slidable plate member 41 towards the resilient switch 13, and if the user presses hard enough on a key 44 the resilient switch 13 will establish an electrical contact.

According to a variation (not shown) of the third embodiment, the plate member 41 is not suspended slidably but rather pivotally. In this variation of the third embodiment the plate member 41 rotates when any of the keys 44 are depressed and the biased switch 13 is activated by a notch or ledge associated with the pivotable plate member.

Figure 13:
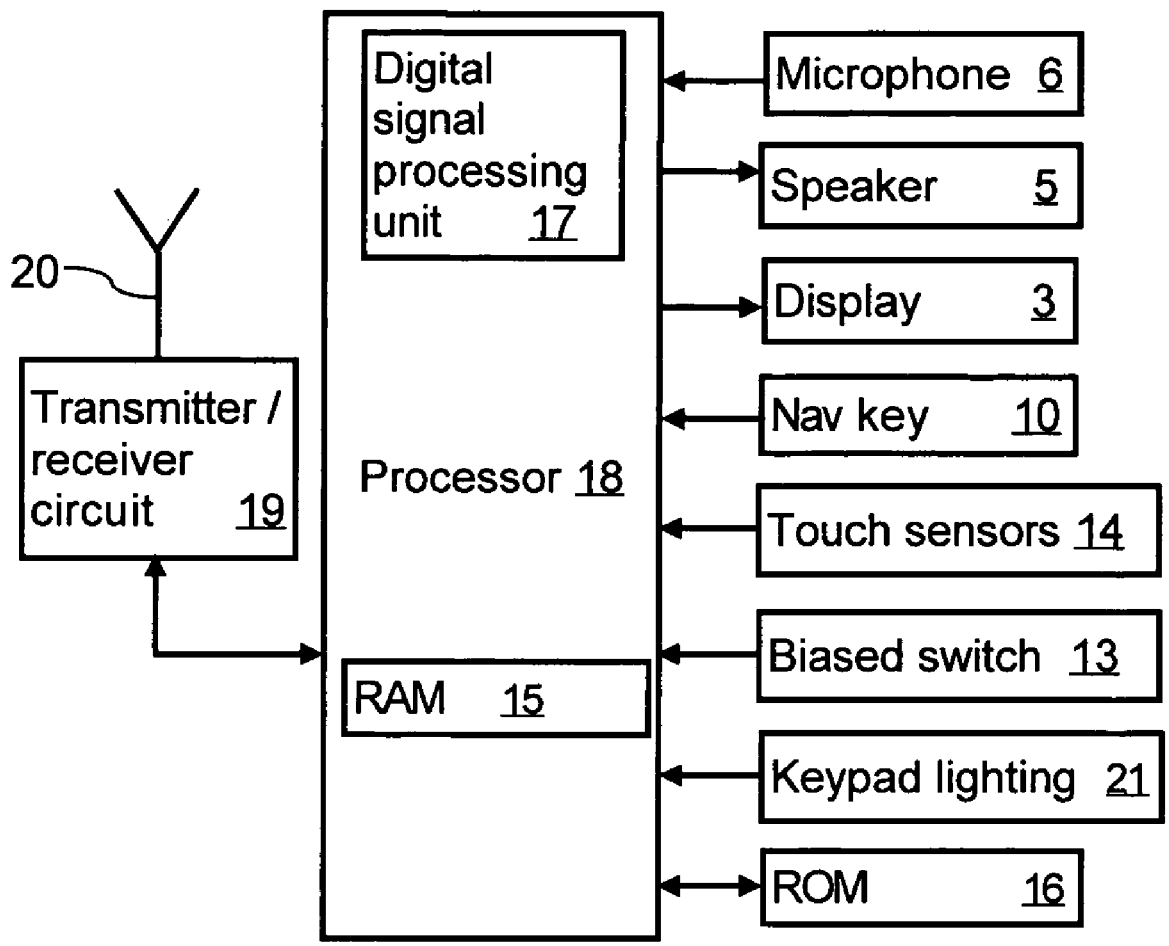
FIG. 13 is a block diagram illustrating the general architecture of a mobile communication terminal of FIG. 1.

FIG. 13 illustrates in block diagram form the general architecture of a mobile phone 1 constructed in accordance with the present invention. A processor 18 controls the communication with the cellular network via the transmitter/receiver circuit 19 and an internal antenna 20. The processor 18 contains the digital signal processing unit (DSP) 17 and a RAM memory 15 whilst a ROM memory 16 is external in relation to the processor 18. A microphone 6 transforms the user's speech into analogue signals, the analogue signals formed thereby are A/D converted in an A/D converter (not shown) before the speech is encoded in the DSP 17. The encoded speech signal is transferred to the processor 18, which e.g. supports the GSM terminal software. The processor 18 also forms the interface to the peripheral units of the apparatus, the Flash ROM memory 16, the graphical display 3, the navigation key 10, the touch sensors 14, a biased switch 13 and keypad lighting 21 (as well as data, power supply, etc.). The digital signal-processing unit 17 speech-decodes the signal, which is transferred from the processor 18 to the speaker 5 via a D/A converter (not shown).

The processor 18 is configured via program commands in the terminal software to recognize which of the keys of the keyboard 7 (according to any of the above embodiments) has been depressed from the signal of the touch sensors 14. The processor 18 is also configured to await the activation of the biased switch 13 before considering a depression of a key as an input. Thus, when the user presses a key of the keyboard 7, the processor 18 can determine by means of a signal from the touch sensors 14 which of those keys is depressed, whilst the processor can determine by means of the signal from the biased switch 13 that a "real" keystroke has been made. The term "real" is used in this context to distinguish from an inadvertent or accidental touch of a key. Without the verification through the biased switch 13 the use of touch sensors 14 in a mobile device, such as a mobile phone would be very problematic (in particular in non-folding or non-sliding models or other models without a keypad cover or protection) since the keys will be touched to a great extent when the device is for example placed in a pocket or a bag or simply held in the hand of the user, and in these situations the activations of the touch sensors should not be regarded as user input.

Further, the biased switch 13 provides tactile feedback that improves user confidence and comfort. Such tactile feedback is not available in conventional touch sensitive keypads. The use of touch sensors or a touch sensitive area allows a much greater freedom in designing and constructing the surface of the keypad, for example due to the absence of parting lines.

The processor 18 can be programmed to await activation of the backlighting of the keys until the biased switch 13 is activated. In order to provide optical feedback to the user the processor 18 can be programmed to activate the backlighting of all or only of the depressed key when the biased switch 13 is activated.

According to a fourth embodiment (not shown) of the keypad according to the invention the keypad includes a touch screen mechanically coupled to a biased switch. The touchscreen is used to display the keypad graphics. The touchscreen is preferably connected to a processor in a device in which the keypad is used and the processor is configured to display the appropriate (virtual) keys in accordance with circumstances. The virtual keys on the touchscreen therefore change in accordance with the application that is running on the device, or could change in response to events, such as a changing status of the device, in accordance with program commands in the software running on the processor of such a device.

Further, the device in which the keypad is used is provided with an orientation sensor, and the processor is configured to change the orientation of the key graphics shown on the touchscreen in accordance with the signal from the orientation sensor. Thus, if the user changes the orientation of the device the processor automatically adapts the keypad graphics to the new orientation of the device, so that the key graphics will maintain the correct orientation with respect to the gravitational field regardless of the orientation of the device.

The keypads described above can be used in any electronic device, such as (stationary) personal computers, computer mice, laptop computers, palmtop computers, mobile phones, mobile navigation devices, music players, audio and visual equipment, control panels for professional equipment, etc.

The term "comprising" as used in the claims does not exclude other elements or steps. The term "a" or "an" as used in the claims does not exclude a plurality.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. An apparatus comprising:
a keypad comprising a plurality of discrete keys formed by touch sensors or a plurality of virtual keys in a touch sensitive area, said plurality of discrete or virtual keys being mechanically coupled to only one underlying biased electrical switch that is activated by downwardly pressing any of said discrete or virtual keys so that the keypad travels downwards to activate the biased electrical switch, wherein the touch sensors or the touch sensitive area are disposed on an upper side of a plate member, and the plate member is coupled to the biased electrical switch and said biased electrical switch is disposed under the plate member and between said plate member and a substrate, wherein the biased electrical switch comprises a collapsible member comprising a thin walled collapsible ring disposed between the plate member and the substrate and arranged substantially centered with relation to the plate, the thin walled collapsible ring comprising an inner ring member and an outer ring member, an outer perimeter of the inner ring member being connected to an inner perimeter of the outer ring member by a fold line, and wherein downwardly pressing any of said discrete or virtual keys results in pressure on the biased electrical switch and causes the inner ring member and the outer ring member to move relative to one another about the fold line and consequent activation of the biased electrical switch and wherein the biased electrical switch is arranged to form an electrical contact in collaboration with a contact disposed on said substrate for establishing electrical contact when activated.

2. An apparatus according to claim 1, wherein said biased electrical switch is configured to provide tactile and/or aural feedback.

3. An apparatus according to claim 1, wherein said biased electrical switch is configured to act with a snap action.

4. An apparatus according to claim 3, wherein the biased electrical switch is a dome switch.

5. An apparatus according to claim 3, wherein the discrete keys are configured to form a flush surface substantially without part lines.

6. An apparatus according to claim 5, wherein said flush surface is provided with key graphics.

7. An apparatus according to claim 6, wherein said key graphics are coupled to a lighting system, and the key graphics are substantially invisible when said lighting system is not active.

8. An apparatus according to claim 1, wherein said keypad includes capacitive elements operatively coupled to said discrete keys.

9. An apparatus according to claim 1, wherein said touch sensitive area is formed by a capacitive touch pad.

10. An apparatus according to claim 1, wherein said touch sensitive area is formed by a touch screen.

11. An apparatus according to claim 1, wherein said biased electrical switch is configured to establish an electrical contact when the collapsible ring collapses, and wherein the diameter of the collapsible ring remains substantially constant when the collapsible ring collapses.

12. An apparatus according to claim 1, wherein the biased electrical switch comprises a resilient element and is configured to urge the plate member to an idle position.

13. An apparatus according to claim 1, wherein a force with a magnitude above a given threshold on said plate member causes said plate member to move from an idle position to a lower position or to a tilted position in which said biased electrical, switch establishes an electrical contact.

14. An apparatus according to claim 13, wherein said plate member is configured to have a substantial amount of travel between the idle position and a position in which the biased electrical switch establishes an electrical contact.

15. An apparatus as claimed in claim 1 wherein the apparatus is a mobile phone.

16. An apparatus as claimed in claim 1 wherein the apparatus is a computer.

17. An apparatus as claimed in claim 1 wherein the apparatus is audio and visual equipment.

18. An apparatus according to claim 1, further comprising a processor configured to control operation of the apparatus, wherein the processor is configured to determine which of said plurality of discrete or virtual keys has been pressed from a signal from said touch sensors or touch plate, and said processor being configured to enter a keystroke only when said biased electrical switch is additionally activated, said entered keystroke corresponding to the determined one of the plurality of discrete or virtual keys.

19. An apparatus comprising:
a processor configured to control operation of the apparatus; and
a keypad, comprising a plurality of discrete keys formed by touch sensors or a plurality of virtual keys in a touch sensitive area, said plurality of discrete or virtual keys being mechanically coupled to only one underlying biased electrical switch that is activated by downwardly pressing any of said discrete or virtual keys so that the keypad travels downwards to activate the biased electrical switch, wherein the touch sensors or the touch sensitive area are disposed on an upper side of a plate member, and the plate member is coupled to the biased electrical switch and said biased electrical switch is disposed under the plate member and between said plate member and a substrate, wherein the biased electrical switch comprises a collapsible member comprising a thin walled collapsible ring disposed between the plate member and the substrate and arranged substantially centered with relation to the plate, the thin walled collapsible ring comprising an inner ring member and an outer ring member, an outer perimeter of the inner ring member being connected to an inner perimeter of the outer ring member by a fold line, and wherein downwardly pressing any of said discrete or virtual keys results in pressure on the biased electrical switch and causes the inner ring member and the outer ring member to move relative to one another about the fold line and consequent activation of the biased electrical switch and wherein the biased electrical switch is arranged to form an electrical contact in collaboration with a contact disposed on said substrate for establishing electrical contact when activated;
said processor being coupled to said keypad and said processor being configured to determine which of said plurality of discrete or virtual keys has been pressed from a signal from said touch sensors or touch plate, and said processor being configured to enter a keystroke only when said biased electrical switch is additionally activated, said entered keystroke corresponding to the determined one of the plurality of discrete or virtual keys.

20. An apparatus according to claim 19, wherein the virtual keys are formed on a touch display and said processor is configured to cause the apparatus to display virtual keys on the touch screen.

21. An apparatus according to claim 19, further comprising an orientation sensor, wherein the processor is configured to cause the apparatus to change the orientation of the virtual keys displayed on the touch screen in response to a signal from said orientation sensor.

22. An apparatus as claimed in claim 19, wherein said biased electrical switch is configured to establish an electrical contact when the collapsible ring collapses, and wherein the diameter of the collapsible ring remains substantially constant when the collapsible ring collapses.

23. A method comprising:
determining, from a signal from a touch sensor or a touchplate, which of a plurality of discrete or virtual keys of a keypad or keyboard has been pressed;
determining whether a biased electrical switch has been activated, wherein the keypad or keyboard comprises only one biased electrical switch and said only one biased electrical switch comprises a collapsible ring member which is centrally arranged beneath the keypad or keyboard, the collapsible ring member comprising an inner ring member and an outer ring member, an outer perimeter of the inner ring member being connected to an inner perimeter of the outer ring member by a fold line, the inner ring member and the outer ring member being configured to move relative to one another about the fold line when at least one of the plurality of discrete or virtual keys has been pressed; and
registering a keystroke only when it is determined that at least one of the plurality of discrete or virtual keys has been pressed and the biased electrical switch has been activated.

24. A method according to claim 23, further comprising allowing said discrete or virtual keys to travel between an idle position in which the biased electrical switch is not activated and a position in which the biased electrical switch is activated.

25. A method according to claim 24 further comprising providing a plurality of said discrete or virtual touch keys with tactile feedback by a mechanical link to the biased switch.

26. A method according to claim 23, wherein said biased electrical switch is configured to establish an electrical contact when the collapsible ring collapses, and wherein the diameter of the collapsible ring remains substantially constant when the collapsible ring collapses.

27. A non-transitory computer-readable storage medium configured with program commands that, when executed by a processor, enable the processor to:

determine, from a signal from a touch sensor or a touchplate, which of a plurality of discrete or virtual keys of a keypad or keyboard has been pressed;

determine whether a biased electrical switch has been activated, wherein the keypad or keyboard comprises only one biased electrical switch and said only one biased electrical switch comprises a collapsible ring member which is centrally arranged beneath the keypad or keyboard, the collapsible ring member comprising an inner ring member and an outer ring member, an outer perimeter of the inner ring member being connected to an inner perimeter of the outer ring member by a fold line, the inner ring member and the outer ring member being configured to move relative to one another about the fold line when at least one of the plurality of discrete or virtual keys has been pressed; and register a keystroke only when it is determined that at least one of the plurality of discrete or virtual keys has been pressed and the biased electrical switch has been activated.

28. A computer-readable storage medium according to claim 27, wherein the keypad or keyboard is configured to allow said discrete or virtual keys to travel between an idle position in which the biased electrical switch is not activated and a position in which the biased electrical switch is activated.

29. A computer-readable storage medium according to claim 27, wherein said biased electrical switch is configured to establish an electrical contact when the collapsible ring collapses, and wherein the diameter of the collapsible ring remains substantially constant when the collapsible ring collapses.

* * * * *